United States Patent
Tylinski et al.

(10) Patent No.: US 8,790,005 B2
(45) Date of Patent: Jul. 29, 2014

(54) SENSOR FOR DETERMINING THE TEMPERATURE IN THE CABIN OF A MOTOR VEHICLE, CLIMATE CONTROL MEMBER FOR AN AIR CONDITIONING SYSTEM OF A MOTOR VEHICLE, AND DEVICE FOR DETERMINING THE TEMPERATURE IN THE CABIN OF A MOTOR VEHICLE

(75) Inventors: Frank Tylinski, Elsdorf (DE); Mario Wirtz, Cologne (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 902 days.

(21) Appl. No.: 12/695,366

(22) Filed: Jan. 28, 2010

(65) Prior Publication Data

US 2010/0189159 A1    Jul. 29, 2010

(30) Foreign Application Priority Data

Jan. 28, 2009    (DE) .................... 20 2009 001 069 U

(51) Int. Cl.
*G01K 13/00*    (2006.01)
(52) U.S. Cl.
USPC .......................................... 374/100; 374/141
(58) Field of Classification Search
CPC ........... G01J 5/02; G01J 5/0215; G01J 5/025; G01J 5/041; G01J 5/08; G01J 5/0875; G01J 5/0893; G01J 5/0846; G01J 2001/4266; G01K 1/20; G01K 13/00; G01K 2201/02
USPC .................... 374/100, 141, 142, 208, E1.011, 374/E13.001, 109, 120
See application file for complete search history.

(56) References Cited

U.S. PATENT DOCUMENTS

| | | | | |
|---|---|---|---|---|
| 3,139,751 | A * | 7/1964 | Kurzrock et al. | 361/161 |
| 4,881,822 | A * | 11/1989 | Ridenour | 374/109 |
| 4,953,986 | A * | 9/1990 | Olson et al. | 374/136 |
| 5,176,451 | A * | 1/1993 | Sasada et al. | 374/179 |
| 5,181,654 | A * | 1/1993 | Yoshimi et al. | 236/91 C |
| 5,340,021 | A * | 8/1994 | Kajino et al. | 236/49.3 |
| 6,185,950 | B1 * | 2/2001 | Baruschke et al. | 62/244 |
| 6,422,062 | B1 * | 7/2002 | King et al. | 73/29.01 |
| 6,709,155 | B2 * | 3/2004 | Knittel et al. | 374/141 |
| 6,843,424 | B2 * | 1/2005 | Weber et al. | 236/49.3 |

(Continued)

FOREIGN PATENT DOCUMENTS

| | | |
|---|---|---|
| DE | 103 12 077 B3 | 8/2004 |
| DE | 20 2004 002 427 U1 | 9/2004 |

*Primary Examiner* — R. A. Smith
*Assistant Examiner* — Tania Courson
(74) *Attorney, Agent, or Firm* — Fraser Clemens Martin & Miller LLC; J. Douglas Miller

(57) ABSTRACT

A sensor for determining a temperature in the cabin of a motor vehicle including a temperature sensor for detecting the temperature of a spatial region adjoining the temperature sensor or surrounding it, a solar sensor for detecting the solar radiation to which the cabin of the motor vehicle is exposed, the temperature sensor and the solar sensor disposed together in a sensor housing, wherein the temperature sensor is connected to two first electric connecting elements which are lead through the sensor housing and the solar sensor is connected to two second electric connecting elements which are lead through the sensor housing, and wherein the first and second connecting elements are configured separately from each other, at least inside the sensor housing.

20 Claims, 3 Drawing Sheets

(56) References Cited

U.S. PATENT DOCUMENTS

| | | | |
|---|---|---|---|
| 6,997,605 B2* | 2/2006 | Trapp et al. | 374/172 |
| 7,198,402 B2* | 4/2007 | Ruettiger | 374/120 |
| 7,325,972 B2* | 2/2008 | Ruettiger | 374/141 |
| 7,517,145 B2* | 4/2009 | Seo et al. | 374/147 |
| 7,723,673 B2* | 5/2010 | Jeitner et al. | 250/239 |
| 8,292,497 B2* | 10/2012 | Pryor et al. | 374/19 |
| 2004/0223534 A1* | 11/2004 | Trapp et al. | 374/172 |
| 2005/0234316 A1* | 10/2005 | Colvin et al. | 600/310 |
| 2011/0240862 A1* | 10/2011 | Knittel et al. | 250/349 |
| 2012/0051393 A1* | 3/2012 | Bard et al. | 374/100 |

* cited by examiner

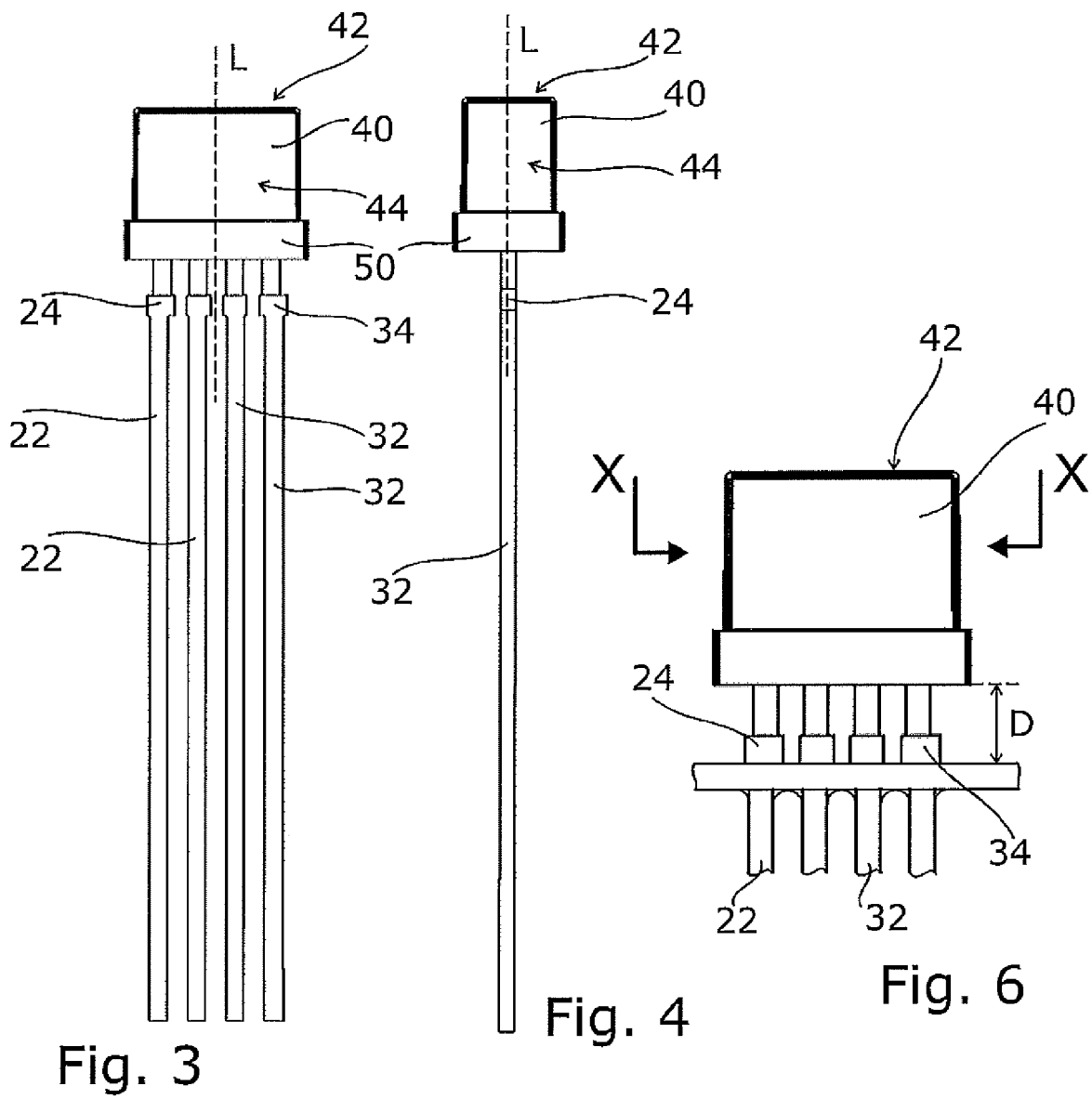
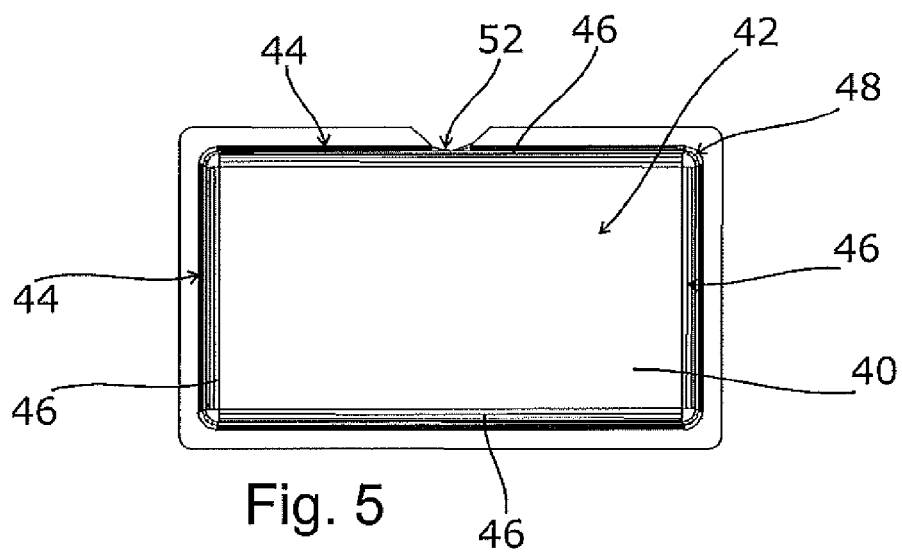

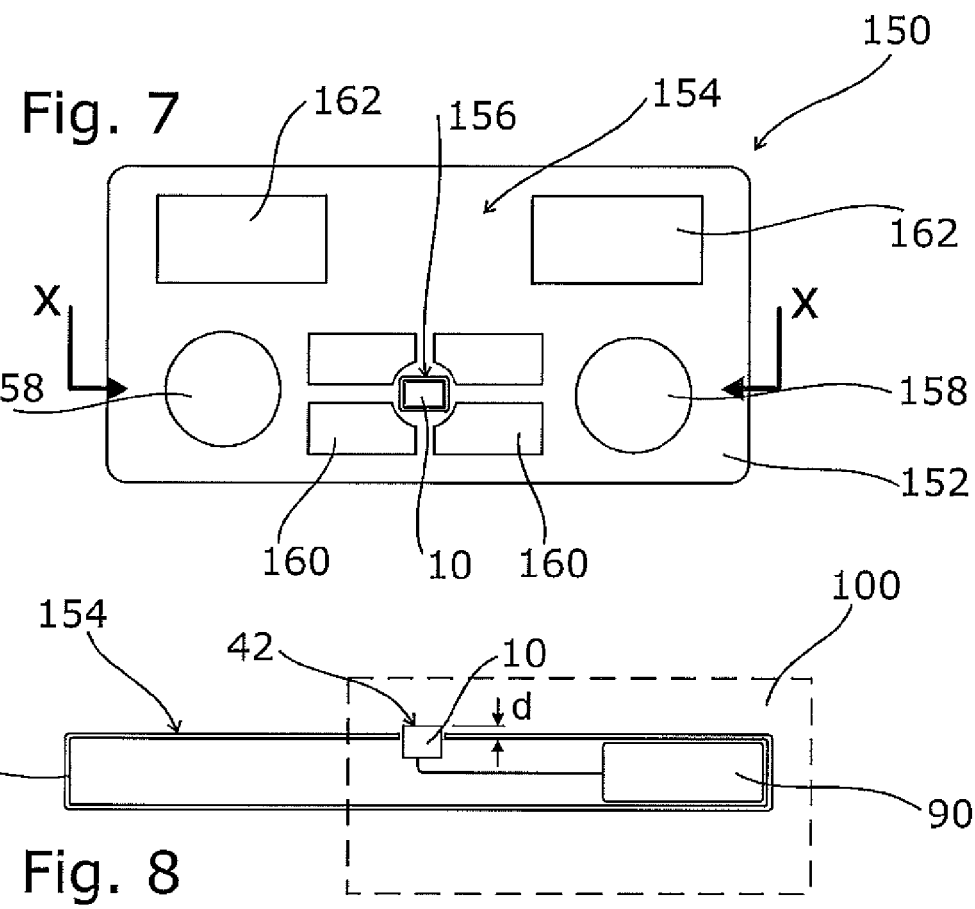
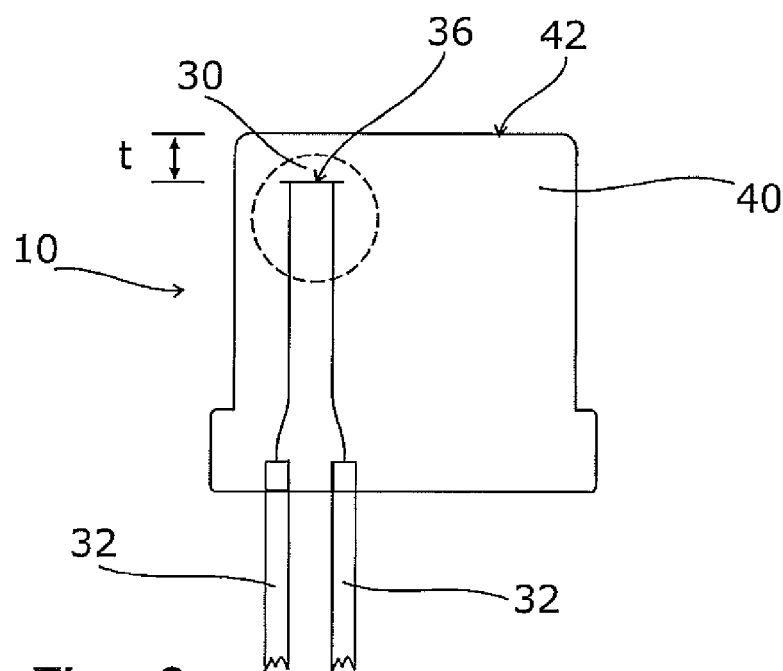

SENSOR FOR DETERMINING THE TEMPERATURE IN THE CABIN OF A MOTOR VEHICLE, CLIMATE CONTROL MEMBER FOR AN AIR CONDITIONING SYSTEM OF A MOTOR VEHICLE, AND DEVICE FOR DETERMINING THE TEMPERATURE IN THE CABIN OF A MOTOR VEHICLE

CROSS-REFERENCE TO RELATED APPLICATION

This application claims priority to German Utility Model Patent Application No. DE 20 2009 001 069.4 filed Jan. 28, 2009, the entire disclosure of which is hereby incorporated herein by reference.

FIELD OF THE INVENTION

The invention relates to a sensor for determining the temperature in the cabin of a motor vehicle, to a climate control member for an air conditioning system of a motor vehicle, and to a device for determining the temperature in the cabin of a motor vehicle based on a sensor according to the invention.

BACKGROUND OF THE INVENTION

Air conditioning systems of motor vehicles are generally provided with a cabin temperature sensor, which is intended to detect the air temperature in the cabin of the motor vehicle. According to a design approach that is widely employed in the state of the art, the temperature sensor is disposed in the sensor housing of a climate control member such that it is protected from exposure to direct sunlight. Thermal contact with the air space of the cabin of the motor vehicle is established in that the sensor is force-ventilated such as by a motor-driven fan. However, this configuration of the cabin temperature sensor has disadvantages with respect to the required installation space and with respect to wear due to the moving parts.

As a result, in another design approach a non-ventilated temperature sensor is used, which is disposed directly in the cabin of the motor vehicle, or in a wall adjoining the cabin. Since the temperature sensor may also be exposed to the incident sun which results in heating of the sensor and consequently in a distortion of the temperature measurement, a variety of non-ventilated temperature sensors are known from the state of the art for detecting the cabin temperature of a motor vehicle in which the sunlight exposure is compensated for. By way of example, reference is made here to DE 20 2004 002 427 U1 and to DE 103 12 077 B3. Both documents disclose devices for determining the temperature in a space, which in particular can be the cabin of a vehicle. The device comprises a temperature sensor and solar sensor combination, the sensors being installed together in a common sensor housing, wherein the common sensor housing can be a standard LED housing, for example. In particular, the cited patents disclose that the sensor housing shape is optimized such that uniform illumination of the solar sensor is ensured even with varying positions of the sun. For this purpose, comparatively complex shapes of the front surface of the sensor housing and of the sensor housing edge located between the front surface and lateral surface of the sensor housing are required. In addition, during practical application, the heat input from the temperature sensor into the solar sensor via a common electrical contact has proven disadvantageous.

It is desirable to provide a sensor for determining the temperature in the cabin of a motor vehicle that avoids the disadvantages mentioned above. In addition, a climate control member for an air conditioning system of a motor vehicle is to be provided, in which a sensor according to the invention is used. Finally, a device is to be provided, which is used to determine the temperature in the cabin of a motor vehicle, while compensating for the heat input by the incident solar radiation.

SUMMARY OF THE INVENTION

A sensor according to the invention is provided for determining the temperature in the cabin of a motor vehicle. The sensor according to the invention is a non-ventilated sensor type, which is to say the sensor does not require installation in or adjacent to the cabin of the motor vehicle that is protected from sun exposure and does not require forced ventilation. The sensor according to the invention comprises a temperature sensor for detecting the temperature of the spatial region that adjoins the sensor according to the invention or surrounds it. Furthermore, the sensor comprises a solar sensor, which is provided for detecting the solar radiation to which the cabin of the motor vehicle is exposed. The temperature sensor and the solar sensor are disposed in a common sensor housing, which can, but does not have to be designed as a standardized semiconductor component housing.

According to the invention, the temperature sensor is connected to two first electric connecting elements, which are led through the sensor housing. Furthermore, the solar sensor is also connected to two second electric connecting elements, which are also lead through the sensor housing. To this end, the first and second connecting elements are configured separately from each other, at least inside the sensor housing. Here, "configured separately from each other" shall in particular be understood such that no electrically conductive connection is provided between the individual first and second connecting elements. Since electrically conductive connections generally have not only electrical conductivity, but also considerably higher thermal conductivity with respect to polymer materials, for example, heat input from the temperature sensor, which during operation is generally permanently or intermittently energized, into the solar sensor can be minimized. Outside of the sensor housing of the sensor according to the invention, optionally an electrically conductive connection between the individual connecting elements of the detectors integrated in the sensor may be provided, however this is not absolutely necessary. It is advantageous in any case to dimension the distance between the electrically conductive connection among the connecting elements and the detectors disposed in the sensor housing sufficiently large, so as to design the length of the thermal bridge between the two detectors created in this way so large that no relevant heat transfer occurs any longer from the temperature sensor to the solar sensor.

In an embodiment of the sensor according to the invention, the sensor housing thereof, which hereafter is referred to in short as a sensor housing, is made completely of a polymer material or at least comprises the same. In both cases, the two detectors, which are part of the sensor according to the invention, are completely embedded in the polymer material. To this end, the polymer material has controlled transmission and/or absorption values. In particular, it exhibits controlled transmission in the wavelength ranges specified in more detail hereafter. The polymer material can be a cured one- or two-component epoxy resin, for example.

In order to produce the sensor housing according to the invention, the polymer material can be filled in the flowable state into a corresponding matrix in which it cures. To this end, the matrix can in particular also be a suitably shaped, separately designed casing part, for example made of plastic, glass, or metal, into which the flowable polymer material is filled and which forms a captive unit with the polymer material after the same has cured.

In the defined wavelength ranges, the polymer material of the sensor housing has reduced transmission, wherein reduced transmission in the range of the visible spectral region of sunlight is provided. A considerable increase in transmission may be provided for starting at an upper threshold wavelength of approximately 700 nm, for example.

As an alternative, or in addition, it may be provided that the polymer material exhibits increased transmission in one or more defined wavelength ranges, wherein this increased transmission can be provided for in particular where the solar sensor disposed in the sensor according to the invention exhibits particularly high spectral sensitivity. To this end, it may be provided, for example, that the solar sensor designed, for example, as a semiconductor component, such as photodiode, exhibits maximum sensitivity in the wavelength range between 800 nm and 1000 nm, with favorable results between 875 nm and 950 nm. Accordingly, it may be provided that the polymer material of the sensor housing exhibits increased transmission in this wavelength range. The sensitivity of the polymer material of the sensor housing is matched to the spectral sensitivity of the solar sensor such that overall a maximum sensitivity of the solar sensor disposed in the sensor housing in the wavelength range between 875 and 950 nm is achieved.

With respect to the shape of the sensor housing of the sensor according to the invention, favorable results have been obtained when configuring the sensor housing in a column shape, which is to say it has a defined longitudinal axis L. Both the temperature sensor and the solar sensor are disposed in a common plane, which is oriented perpendicular to this longitudinal axis L. Here, a certain offset between the solar sensor and temperature sensor along the longitudinal axis L of the column can be tolerated. Favorable results have been obtained when this offset is less than 1 mm, and in particular less than 0.5 mm.

The sensor housing may have a polygonal cross-section transversely to the longitudinal axis L of the column, wherein the cross-section has the shape of a regular square. The shape of a regular triangle, square, pentagon, hexagon or octagon may also be used.

In another embodiment of the sensor according to the invention, the sensor housing has a radius of curvature ranging between 0.01 mm and 1 mm, preferably between 0.1 mm and 0.25 mm, in the corners of the polygonal cross-section, which is to say in the housing edges extending in the direction of the longitudinal axis L. By providing rounded vertical edges of the sensor housing, the production thereof is significantly simplified. In particular, the production of tools for manufacturing the sensor housing using suitable plastic injection molding methods is simplified. Furthermore, the finished plastic sensor housings are easier to demold.

As already mentioned above, the sensor housing has a cover surface, which is provided to be disposed substantially parallel to the front panel of a control member of a motor vehicle in the installation position of the sensor according to the invention, this front panel in turn being oriented toward the cabin of the motor vehicle.

Particular advantages with respect to uniform illumination of the components disposed in the sensor housing, specifically the solar sensor and temperature sensor, are achieved by designing the cover surface of the sensor housing substantially planar or convex (relative to the longitudinal axis L of the sensor housing). Particularly, with a convex design of the cover surface, it is possible to minimize intensity variations on the light-sensitive surface of the solar sensor as the position of the sun changes. A planar cover surface, in contrast, has the advantage of being particularly easy to manufacture because the production of the corresponding molds for suitable plastic injection molding methods is especially simple.

In connection with the compensation for varying intensities on the light-sensitive surface of the solar sensor as the position of the sun changes, it has furthermore proven advantageous if the horizontal housing edges located between the cover surface of the sensor housing and the lateral surfaces thereof have a radius of curvature that ranges between 0.01 mm and 1 mm. For these edges, a radius of curvature between 0.1 mm and 0.25 mm provides favorable results.

Favorable results have also been obtained where the lengths of the first and/or second connecting elements outside of the sensor housing are at least 10 mm, preferably however at least 20 mm. In this way, it is possible to dispose a sensor according to the invention at a considerable distance from a circuit board beneath, which enables advantages with respect to the heat input into the sensor from the circuit board. In order to ensure a defined target distance of the sensor housing from a circuit board during assembly of the sensor according to the invention with the circuit board, one or more protrusions may be configured at one or more of the connecting elements. During assembly of the sensor with a circuit board, they form a stop for inserting the connecting elements into the holes provided in the circuit board, thereby determining a minimum distance of the sensor housing from the circuit board. The first and second connecting elements may be disposed on a standard leadframe of 5 mm, for example, which considerably improves the usability of a sensor according to the invention in printed circuit boards.

With respect to the temperature sensor provided in the sensor according to the invention, it has proven advantageous to design it as an NTC. Regardless of the special design of the temperature sensor, it has proven advantageous, depending on the application, for the temperature sensor employed to exhibit the highest sensitivity in the temperature range around 25° C., particularly in the interval between 5° C. and 45° C. Beyond that, it is advantageous for the temperature sensor employed to have a specified measurement range in which the resistance thereof is 5 kohm or more, preferably greater than 10 kohm. This can also be implemented by a temperature sensor designed as an NTC. The above specified measurement range agrees at least with the above temperature interval in which the temperature sensor exhibits the highest sensitivity thereof. The specified measurement range, however, comprises at least the temperature interval from −10° C. to +80° C., preferably even from −40° C. to +105° C.

With respect to the sensitivity of the solar sensor, it has proven advantageous for the solar sensor installed in the sensor according to the invention to have the highest spectral sensitivity in the wavelength range between 800 nm and 1000 nm, preferably in the interval between 875 and 950 nm. It is also possible to generate the desired spectral sensitivity curve of the sensor according to the invention by appropriately combining the spectral transmission properties of the plastic material used for the sensor housing with the spectral sensitivity of the solar sensor used. In particular, the plastic material can be provided with suitable absorption edges in order to limit the spectral sensitivity of the solar sensor to the desired wavelength interval.

As was already mentioned above, the solar sensor used in the sensor according to the invention generally has a light incidence surface. If such a surface is present, it is preferably disposed substantially parallel to the cover surface of the sensor housing and has a distance t from the cover surface of the sensor housing that is no larger than 2 mm, preferably no larger than 1 mm. In this way, it is possible, in the installation position of the sensor, such as in the front panel of a control member of a motor vehicle, for the cover surface of the sensor according to the invention to end practically flush with, or with little protrusion beyond this front panel.

The present invention further relates to a climate control member for an air conditioning system of a motor vehicle, which is based on a sensor according to the invention. In one or more of the advantageous embodiments described above, such a sensor may have any arbitrary combination, provided it is technically meaningful. The climate control member comprises a sensor housing, which comprises a front surface that is oriented toward the cabin of the motor vehicle in the installation position of the climate control member. To this end, an opening through which the sensor leads with the cover surface thereof is configured in the front surface of the climate control member. Alternatively, a further control element for the climate control member may be configured in the front surface, wherein this additional control element in turn forms a front surface in which an opening is provided for the sensor according to the invention to be led through. Instead of an opening, it is also possible to provide a suitably dimensioned window in the respective front surface of the climate control member or the control element. The sensor is preferably disposed in this front surface of the climate control member such that the cover surface of the sensor is disposed between 0.5 mm and 2 mm above the front surface of the climate control member, preferably between 0.75 mm and 1.25 mm. Of course it is also conceivable to have the cover surface of the sensor end flush with the front surface of the climate control member. It has proven particularly advantageous for the light incidence surface of the solar sensor to be oriented substantially parallel to the front surface of the sensor housing of the climate control member in the installation position of the sensor. To this end, the light incidence surface of the solar sensor should be disposed substantially in the plane of the front surface of the climate control member or above the same.

Another object of the invention is a device for determining the temperature in the cabin of a motor vehicle. Such a device comprises a sensor according to the invention according to one or more of the preferred embodiments described above in a technically meaningful combination. The device furthermore comprises a processing unit which receives measurement signals from the temperature sensor disposed in the sensor according to the invention and the solar sensor. The processing unit then uses these signals to generate an output signal which is representative of the temperature in the cabin of the motor vehicle. The device for determining the temperature is preferably part of a climate control member of a motor vehicle, which is provided for actuating a motor vehicle air conditioning system. In particular, it may be provided to dispose the processing unit of the temperature determination device in the sensor housing of the climate control member.

BRIEF DESCRIPTION OF THE DRAWINGS

Further advantages and characteristics of the sensor according to the invention, the climate control member according to the invention, and the device according to the invention for determining the temperature in the cabin of the motor vehicle are apparent from the dependent claims and the exemplary embodiment, which is explained hereafter with reference to the drawing: Shown are:

FIG. 3: a first side view of the sensor according to the invention from FIG. 1, FIG. 4: a further side view of the sensor from FIG. 1, FIG. 5: a top view from above onto the cover surface of the sensor housing of the sensor from FIG. 1, FIG. 6: a side view of the sensor from FIG. 1 according to the illustration from FIG. 3 in the installation position on a circuit board, FIG. 7: a schematic illustration of a front surface of a climate control member comprising an integrated sensor according to the invention, FIG. 8: a simplified sectional representation through the sensor housing of the climate control member from FIG. 7 along the arrows X-X in FIG. 7, and FIG. 9: a simplified sectional representation through the sensor housing of the sensor according to the invention from FIG. 1, the cutting direction being indicated by the arrows X-X from FIG. 6.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
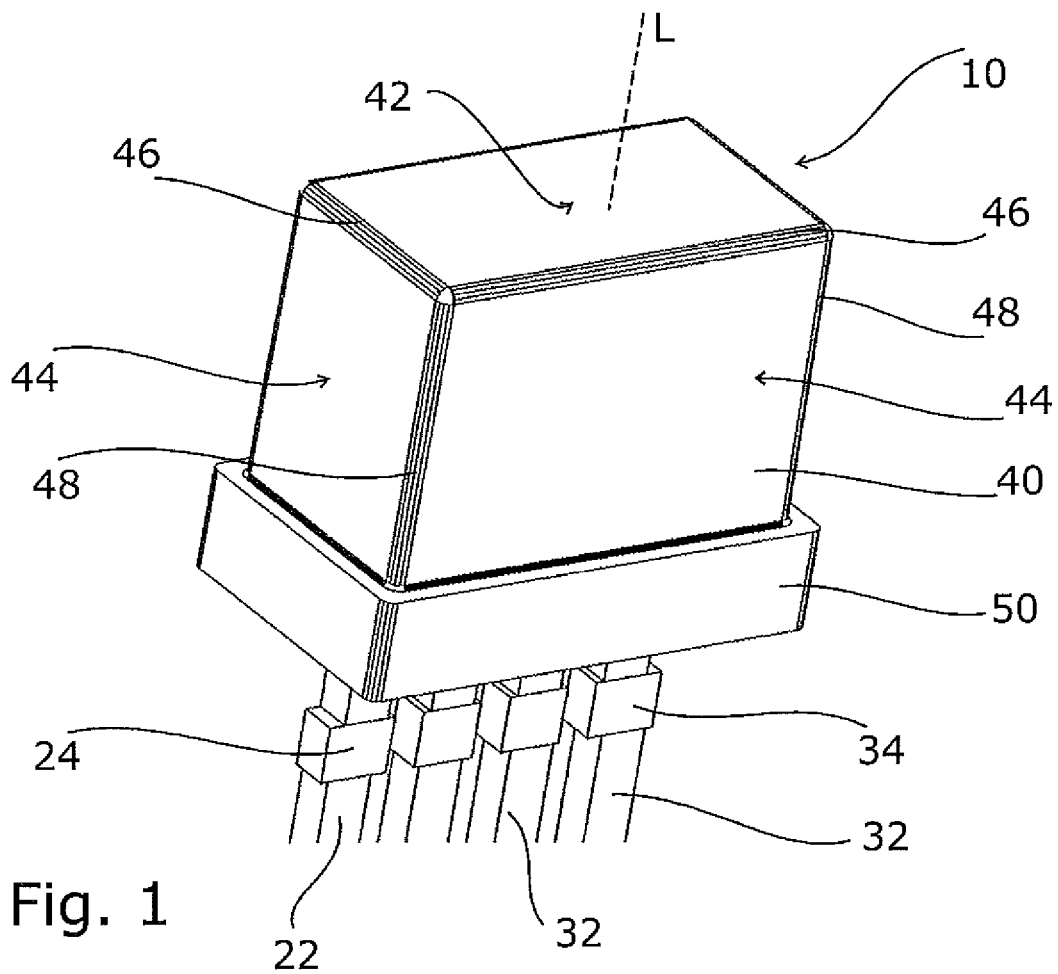
FIG. 1: a perspective illustration of a sensor according to the invention.

FIG. 1 shows a perspective illustration of a sensor 10 according to the invention. It is clearly apparent that the sensor housing 40 of the sensor 10 here is configured as a freely designed housing and not as a standardized semiconductor component housing. The sensor housing 40 has a cuboid design, which is to say the cross-section of the housing 40 perpendicular to the longitudinal axis L indicated in FIG. 1 is rectangular. Both the housing edges 46 extending in the horizontal direction and located between the cover surface 42 and the lateral surfaces 44 and the housing edges 48 extending vertically and disposed between the lateral surfaces 44 are rounded.

In the embodiment shown, the edge length of the short side of the cover surface 42 is 3 or 3.5 mm, and the edge length of the long side of the cover surface 42 is 6 mm. The entire height of the cuboid sensor housing 40, including the assembly projection 50 connected to the bottom thereof in one piece, is approximately 5 mm. The assembly projection 50 is intended to provide a stop for the installation of the sensor 10 according to the invention in the opening of a front plate of a control member for a motor vehicle, for example.

In the embodiment illustrated in FIG. 1, the horizontal edges 46 are rounded both on the narrow side and on the longitudinal side of the rectangular cover surface 42. The radius of curvature here is approximately 0.2 mm. The cover surface 42 as such is designed as a planar surface, as are the lateral surfaces 44. The vertically extending housing edges 48 are likewise rounded, and the radius of curvature is approximately 0.2 mm here too.

Figure 2:
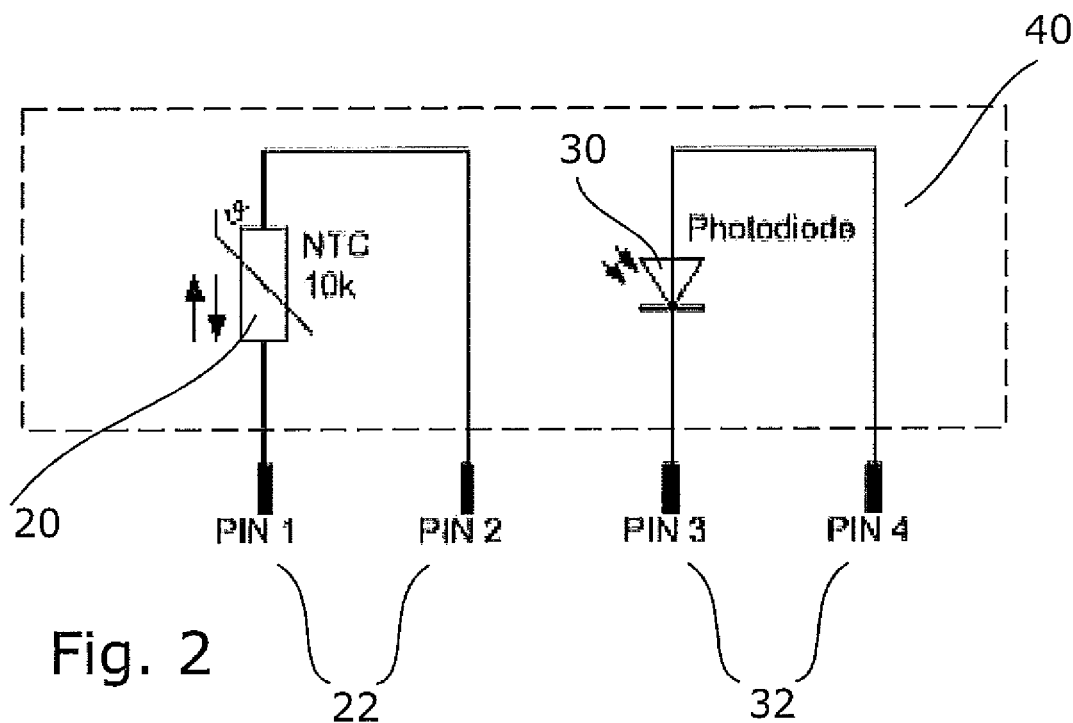
FIG. 2: a circuit diagram of the electric sensor elements provided in the sensor according to the invention.

The electric components disposed inside the sensor housing 40 of the sensor 10 and the circuitry thereof are apparent from FIG. 2. For example, a temperature sensor 20 configured as an NTC and a photodiode 30 are disposed inside the sensor housing 40. Both electrical components are completely embedded into the material of which the sensor housing 40 is made, which is to say they are potted. The sensor housing 40 is made of semitransparent plastic, which is preferably colored, in particular dyed black. An epoxy resin, for example, may be used as the plastic for the sensor housing.

It is also apparent from FIG. 2 that the temperature sensor 20 and the solar sensor 30 inside the sensor housing 40 are not electrically connected to each other. Rather, a pair each of first and second electric connecting elements 22, 32 are provided for the external wiring of both the solar sensor 30 and the temperature sensor 20. By foregoing electrically conductive connections between the temperature sensor 20 and the solar sensor 30 inside the sensor housing 40, heat input from one component into the other, particularly from the temperature sensor 20 into the solar sensor 30, can be largely avoided. In this way, it can be ensured that over the entire operating temperature range of the sensor 10 interference of the measurement of the solar intensity by the solar sensor 30 configured as a semiconductor component in the form of a photodiode is avoided.

It is further apparent from FIG. 1 that each of the first and second connecting elements 22, 32 forms a projection 24, 34, which is used to ensure a minimum distance D between the lower edge of the sensor housing 40 and the circuit board 164 during assembly of the sensor 10 with the circuit board 164.

FIG. 6 shows a side view of the sensor 10 from FIG. 1 in a state mounted on a circuit board 164. The arrangement of the projections 24, 34 on the first and second connecting elements 22, 32 is dimensioned such that the distance D between the lower edge of the sensor housing 40 and the circuit board 164 apparent from FIG. 6 is at least 4 mm, preferably 5 mm or more.

FIGS. 3, 4, and 5 show the sensor from FIG. 1 again in two side views and a top view, which again illustrate the basic cuboid shape of the sensor housing 40. The first and second connecting elements 22, 32 are arranged on a standard leadframe. FIG. 5 finally shows a notch 52, which is configured in a longitudinal side of the assembly projection 50. It is provided to visually differentiate between the first connecting elements 22 and the second electric connecting elements 32.

From FIG. 7 finally a front view of the front surface 154 of the sensor housing 152 of a climate control member 150 is apparent, which is provided for controlling a motor vehicle air conditioning system. It is provided for arrangement in the instrument panel of a motor vehicle, for example in the region of the center console. In the front surface 154 of the housing 152, two rotary adjustment knobs 158 are provided for controlling the functions of the air conditioning system, furthermore, there are a plurality of control elements 160 configured as buttons, and two display elements 162, which can be configured, for example, as LCD displays and are used to display the set target operating parameters of the motor vehicle air conditioning system. An opening 156 is provided in the front surface 154 of the housing 152 at the center of the typically arranged control element 160. In this opening 156, a sensor 10 according to FIG. 1 is arranged such that the longitudinal axis L of the sensor 10 is oriented perpendicular to the front surface 154 of the housing 152 of the climate control member 150. To this end, the cover surface 42 of the sensor 10 is arranged above the front surface 154 by about an amount d of 1 mm. This is shown again in FIG. 8, which illustrates a sectional representation through the housing 152 of the climate control member 150. It is further apparent from the sectional representation that inside the housing 152 of the climate control member 150 a processing unit 90 is disposed, which has an electric connection both to the temperature sensor 20 and to the solar sensor 30 of the sensor 10 according to the invention. The processing unit 90 is equipped to generate an output signal, which represents the temperature in the cabin of the motor vehicle, based on the signals received from the sensor 10, wherein the output signal is then used in a suitable manner in the climate control member 150 for controlling the motor vehicle air conditioning system.

FIG. 9 finally shows a schematic illustration of a sectional view through the sensor housing 40 of the sensor 10 from FIG. 1 in order to illustrate the arrangement of a light incidence surface 36 of the solar sensor 30 disposed in the sensor housing 40. The light incidence surface is configured substantially as a planar surface and oriented parallel to the cover surface 42 of the sensor housing 40. The distance t of the light incidence surface 36 from the cover surface 42 is preferably 1.5 mm or less, in the embodiment shown it is approximately 0.75 mm. The sensor 10 according to the invention shown in the embodiment is preferably disposed in the front surface 154 of the climate control member 150 such that the light incidence surface 36 is located above the front surface 154 of the sensor housing 152, which is to say t≥d.

From the foregoing description, one ordinarily skilled in the art can easily ascertain the essential characteristics of this invention and, without departing from the spirit and scope thereof, make various changes and modifications to the invention to adapt it to various usages and conditions.

| Reference numerals | |
|---|---|
| 10 | Sensor |
| 20 | Temperature sensor |
| 22 | First electric connecting elements |
| 24 | Projection |
| 30 | Solar sensor |
| 32 | Second electric connecting elements |
| 34 | Projection |
| 36 | Light incidence surface |
| 40 | Sensor housing |
| 42 | Cover surface |
| 44 | Lateral surface |
| 46 | Horizontal housing edge |
| 48 | Vertical housing edge |
| 50 | Assembly projection |
| 52 | Notch |
| 90 | Processing unit |
| 100 | Device for determining the temperature |
| 150 | Climate control member |
| 152 | Housing |
| 154 | Front surface |
| 156 | Opening |
| 158 | Rotary adjustment knob |
| 160 | Control element |
| 162 | Display element |
| 164 | Circuit board |

What is claimed is:

1. A sensor for determining a temperature in a cabin of a motor vehicle comprising:
   a housing having an outer wall;
   a temperature sensor disposed in the housing for detecting a temperature of a spatial region adjoining the temperature sensor, wherein the temperature sensor is connected to two first electric connecting elements extending through the outer wall of the housing, the first electric connecting elements providing external wiring of the temperature sensor; and a solar sensor disposed in the housing for detecting the solar radiation to which the cabin of the motor vehicle is exposed, wherein the solar sensor is connected to two second electric connecting elements extending through the outer wall of the housing, the second electric connecting elements providing external wiring of the solar sensor, and wherein the first connecting elements of the temperature sensor and the second connecting elements of the solar sensor are configured separately from each other such that no electrically conductive connection is provided between the first connecting elements of the temperature sensor and the second connecting elements of the solar sensor.

2. The sensor according to claim 1, wherein the housing is produced from a polymer material.

3. The sensor according to claim 2, wherein the polymer material is a curable epoxy resin.

4. The sensor according to claim 2, wherein at least one of the solar sensor and the temperature sensor is embedded in the polymer material of the housing.

5. The sensor according to claim 2, wherein the polymer material exhibits reduced transmission in defined wavelength ranges.

6. The sensor according to claim 5, wherein the wavelength range of reduced transmission substantially agrees with the visible spectral region of solar light.

7. The sensor according to claim 2, wherein the polymer material exhibits increased transmission in defined wavelength ranges.

8. The sensor according to claim 1, wherein the housing has a column shape.

9. The sensor according to claim 8, wherein the housing has a polygonal cross-section transversely to a longitudinal axis of the column shape.

10. The sensor according to claim 9, wherein the polygonal cross-section is one of a triangle, a square, a pentagon, a hexagon, and an octagon.

11. The sensor according to claim 10, wherein vertical housing edges which are oriented in a direction of the longitudinal axis of the housing have a radius of curvature ranging between 0.01 mm and 1 mm.

12. The sensor according to claim 1, wherein the housing includes a cover surface with one of a substantially planar and a convex design.

13. The sensor according to claim 12, wherein edges extending between the cover surface and lateral surfaces of the housing have a radius of curvature ranging between 0.01 mm and 1 mm.

14. The sensor according to claim 12, wherein the solar sensor includes a light incidence surface oriented substantially parallel to the cover surface of the housing and has a distance from the housing that is no larger than 2 mm.

15. The sensor according to claim 1, wherein a length of the first connecting elements and the second connecting elements outside of the housing is at least 10 mm.

16. The sensor according to claim 1, wherein the temperature sensor exhibits a highest sensitivity at about 25° C.

17. The sensor according to claim 1, wherein the temperature sensor has a specified measurement range in which the resistance thereof is at least 5 kohm.

18. The sensor according to claim 17, wherein the specified measurement range a temperature interval from −40° C. to 105° C.

19. The sensor according to claim 1, wherein the solar sensor exhibits a highest sensitivity in a wavelength range between 800 nm and 1000 nm.

20. A sensor for determining a temperature in a cabin of a motor vehicle comprising:
a housing having an outer wall including a cover surface, wherein the housing is disposed in a climate control member of the motor vehicle, and wherein the cover surface extends outwardly from a surface of the climate control member;
a temperature sensor disposed in the housing for detecting a temperature of a spatial region adjoining the temperature sensor, wherein the temperature sensor is connected to two first electric connecting elements extending through the outer wall of the housing, the first electric connecting elements providing external wiring of the temperature sensor; and
a solar sensor disposed in the housing for detecting the solar radiation to which the cabin of the motor vehicle is exposed, wherein the solar sensor is connected to two second electric connecting elements extending through the outer wall of the housing, the second electric connecting elements providing external wiring of the solar sensor, and wherein the first connecting elements of the temperature sensor and the second connecting elements of the solar sensor are configured separately from each other inside the housing such that no electrically conductive connection is provided between the first connecting elements of the temperature sensor and the second connecting elements of the solar sensor.

* * * * *